US009042308B2

(12) United States Patent
Zhao et al.

(10) Patent No.: US 9,042,308 B2
(45) Date of Patent: *May 26, 2015

(54) SYSTEM AND METHOD FOR CONNECTING A WIRELESS TERMINAL TO A NETWORK VIA A GATEWAY

(71) Applicant: Marvell World Trade LTD., St. Michael (BB)

(72) Inventors: Fan Zhao, San Jose, CA (US); Stefano Faccin, Hayward, CA (US); Ameya Damle, Santa Clara, CA (US)

(73) Assignee: Marvell World Trade LTD., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 14/293,513

(22) Filed: Jun. 2, 2014

(65) Prior Publication Data

US 2014/0269515 A1 Sep. 18, 2014

Related U.S. Application Data

(63) Continuation of application No. 12/950,759, filed on Nov. 19, 2010, now Pat. No. 8,743,747, which is a continuation of application No. 12/245,981, filed on Oct. 6, 2008, now Pat. No. 7,839,874.

(Continued)

(51) Int. Cl.
*H04W 4/00* (2009.01)
*H04W 48/18* (2009.01)
(Continued)

(52) U.S. Cl.
CPC ......... *H04W 48/18* (2013.01); *H04L 29/12207* (2013.01); *H04L 61/20* (2013.01);
(Continued)

(58) Field of Classification Search
USPC ......... 370/280–281, 295, 260–269, 225–228, 370/329–339, 343–349, 342, 311, 346–350, 370/431

See application file for complete search history.

(56) References Cited

U.S. PATENT DOCUMENTS 7,142,503 B1 11/2006 Grant et al.
7,181,193 B2 2/2007 Ansamaa
(Continued)

OTHER PUBLICATIONS

DHCP Option for Home Information Discovery in MIPv6; draft-jeff-mip6-hiopt-05.txt; Hee Jin Jang, Alper Yegin, Samsung, Kuntal Chowdhury, Starent Networks, JinHyeock Choi, Samsung; Jun. 13, 2007; 19 Pages.
MIP6-Bootstrapping for the Integrated Scenario; draft-jeff-mip6-bootstrapping-integrated-05.txt; K. Chowdhury, Editor, Starent Networks, A. Yegin, Samsung AIT; Jun. 20, 2007; 16 Pages.

(Continued)

*Primary Examiner* — Iqbal Zaidi

(57) ABSTRACT

A system including (i) a first gateway providing access to a first network and a second network, and (ii) a second gateway providing access to the second network. A network device determines whether a wireless terminal is communicating with the first network via the first gateway and attempting to communicate with the second network via the second gateway. The network device determines whether the first gateway permits the wireless terminal to communicate with the second network. In response to determining that the wireless terminal is communicating with the first network via the first gateway and is attempting to communicate with the second network via the second gateway and that the first gateway permits the wireless terminal to communicate with the second network, the network device permits the wireless terminal to access the second network via the first gateway prior to the wireless terminal establishing a connection with the second gateway.

22 Claims, 10 Drawing Sheets

Related U.S. Application Data

(60) Provisional application No. 60/984,147, filed on Oct. 31, 2007, provisional application No. 60/984,940, filed on Nov. 2, 2007, provisional application No. 61/013,511, filed on Dec. 13, 2007.

(51) Int. Cl.
| | | |
|---|---|---|
| *H04L 29/12* | (2006.01) | |
| *H04W 48/00* | (2009.01) | |
| *H04W 48/08* | (2009.01) | |
| *H04L 29/06* | (2006.01) | |
| *H04W 12/04* | (2009.01) | |
| *H04W 80/04* | (2009.01) | |
| *H04W 88/00* | (2009.01) | |

(52) U.S. Cl.
CPC ............ *H04L 63/061* (2013.01); *H04W 12/04* (2013.01); *H04W 48/17* (2013.01); *H04W 80/04* (2013.01); *H04W 88/005* (2013.01); *H04W 48/08* (2013.01)

(56) References Cited

U.S. PATENT DOCUMENTS

| | | | |
|---|---|---|---|
| 7,292,587 | B2 | 11/2007 | Knauerhase et al. |
| 7,324,529 | B2 | 1/2008 | Lucidarme et al. |
| 7,391,298 | B1 | 6/2008 | Campbell et al. |
| 2002/0136226 | A1 | 9/2002 | Christoffel et al. |
| 2002/0181484 | A1* | 12/2002 | Aimoto ..................... 370/413 |
| 2004/0006573 | A1 | 1/2004 | Takashi |
| 2007/0153690 | A1* | 7/2007 | Stanwood et al. ............ 370/230 |

OTHER PUBLICATIONS

Mobile IPv6 Bootstrapping in Split Scenario: draft-jeff-mip6-bootstrapping-split-07; G. Giaretta, Ed., Qualcomm, J. Kemfp, DoCoMo Labs USA, V. Devarapalli, Ed., Azaire Networks; Jul. 22, 2007; 25 Pages.

Mobile IPv6 Support for Dual Stack Hosts and Routers (DSMIPv6); draft-jeff-mip6-nemov4traversal-05.txt; Hesham Soliman (Ed.), Elevate Technologies; Jul. 2007; 26 Pages.

Mobility Header Home Agent Switch Message; draft-jeff-mip6-ha-switch-03.txt; B. Haley, Hewlett-Packard, V. Devarapalli, Azaire Networks, H. Deng, Hitachi, J. Kempf, DoCoMo USA Labs; Mar. 2007; 11 Pages.

RFC 3748; Extensible Authentication Protocol (EAP); B. Aboba, Microsoft; L. Blunk, Merit Network Inc., J. Volibrecht, Vollbrecht Consulting LLC, J. Carlson, Sun, H. Levkowetz, Ed., ipUnglugged; Jun. 2004; 60 Pages.

RFC 3775; Mobility Support in IPv6; D. Jonson, Rice University, C. Perkinds, Nokia Research Center, J. Arkko, Ericsson; Jun. 2004; 165 Pages.

RFC 4187; Extensible Authentication Protocol Method for 3ra Generation Authentication and Key Agreement (EAP-AKA); J. Arkko, Ericsson, H. Haverinen, Kokia; Jan. 2006; 71 Pages.

RFC 4301; Security Architecture for the Internet Protocol; S. Kent, K. Seo, BBN Technologies; Dec. 2005; 90 Pages.

RFC 4306; Internet Key Exchange (IKEv2) Protocol; C. Kaufman, Ed., Microsoft; Dec. 2005; 89 Pages.

RFC 4640; Problem Statement for Bootstrapping Mobile IPv6 (MIPv6); A. Patel, Ed., Cisco, G. Giaretta, Ed., Telecom Italia; Sep. 2006; 20 Pages.

\* cited by examiner

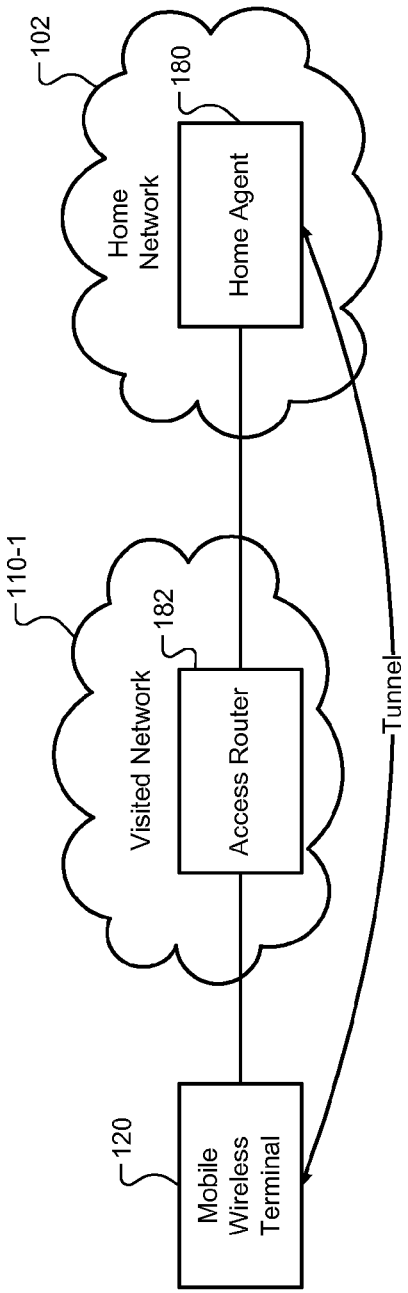
FIG. 3A
_Prior Art_
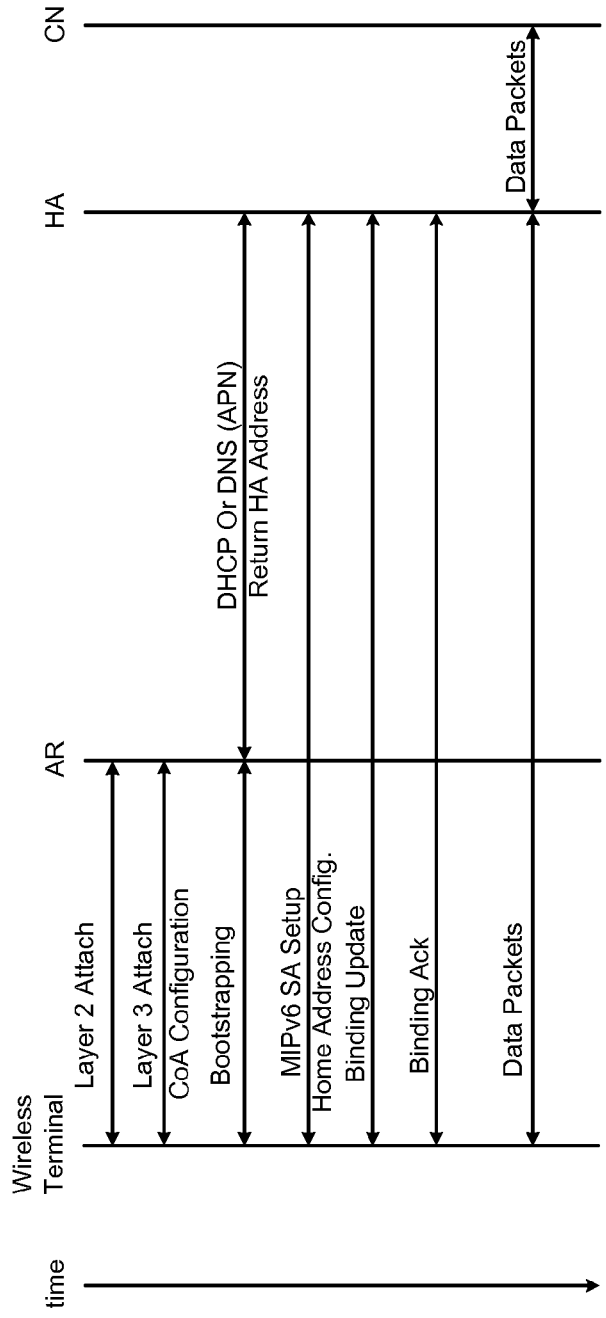
FIG. 3B
_Prior Art_

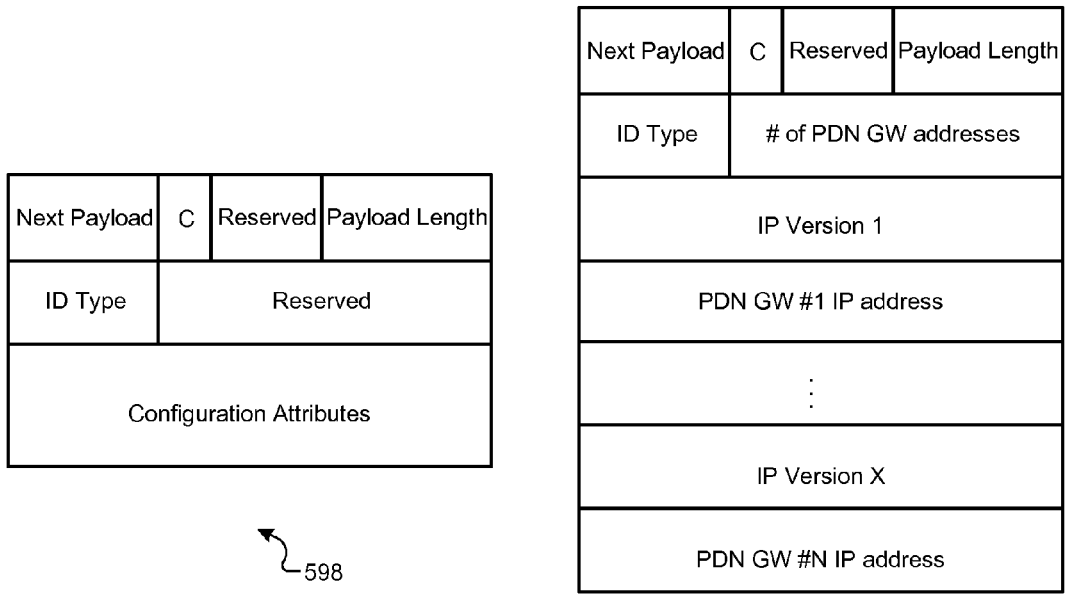

SYSTEM AND METHOD FOR CONNECTING A WIRELESS TERMINAL TO A NETWORK VIA A GATEWAY

CROSS-REFERENCE TO RELATED APPLICATIONS

The present disclosure is a continuation of U.S. patent application Ser. No. 12/950,759 (now U.S. Pat. No. 8,743, 747), filed Nov. 19, 2010, which is a continuation of U.S. application Ser. No. 12/245,981 (now U.S. Pat. No. 7,839, 874), filed Oct. 6, 2008. This application claims the benefit of U.S. Provisional Application No. 60/984,147, filed Oct. 31, 2007; U.S. Provisional Application No. 60/984,940, filed Nov. 2, 2007; and U.S. Provisional Application No. 61/013, 511, filed Dec. 13, 2007. The entire disclosures of the applications referenced above are incorporated herein by reference.

FIELD

The present disclosure relates generally to network systems and more particularly to host-based mobility for network systems.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Referring now to FIG. 1, a functional block diagram of a wireless communications system is presented. A home network 102 receives packets from and sends packets to a packet data network (PDN) 104, such as the Internet. A wireless terminal 106 wirelessly connects to the home network 102. For example, the wireless terminal 106 may be a mobile phone, and the home network 102 may be the cellular network of a mobile phone operator.

The wireless terminal 106 is configured to work with the home network 102 and may be unable to connect to the networks of other carriers. In various implementations, the wireless terminal 106 may be able to view content from the PDN 104 via the home network 102. The home network 102 may interconnect with the networks of other service providers.

Referring now to FIG. 2, a functional block diagram of a wireless communications system offering mobility is presented. The home network 102 is connected to one or more visited networks 110-1, 110-2, . . . , and 110-X (referred to herein as visited networks 110). In various implementations, the visited networks 110 may be the networks of other service providers, including service providers in other countries.

In FIG. 2, the mobile wireless terminal 120 has established a wireless connection to the visited network 110-1. The mobile wireless terminal 120 includes the code and data used to communicate with the home network 102 via the visited network 110-1. In this way, the mobile wireless terminal 120 can interface with the home network 102 even when connected to one of the visited networks 110.

The mobile wireless terminal 120 includes mobility features that allow the mobile wireless terminal 120 to communicate with the visited networks 110. The mobile wireless terminal 120 may use a host-based Internet protocol (IP) when handling mobility management. A mobility protocol may include a mobile IP (MIP), which may refer to a host-based IP or a network-based IP. Dual stack mobile IP (DSMIP) is an exemplary host-based mobility protocol. Several versions are available. For example, DSMIPv6 includes a mobile wireless terminal 120 that extends its IP stack when changing its point of attachment. The mobile wireless terminal 120, according to DSMIPv6 is also involved in signalling that enables IP mobility. DSMIPv6 is often referred as client mobile IP (CMIP). DSMIPv6 is described in request for comment (RFC) 3775, titled "Mobility Support in IPv6," the disclosure of which is hereby incorporated by reference in its entirety.

Referring now to FIGS. 3A-3B, a functional block diagram and timeline of an implementation of host-based mobility are presented, respectively. The mobile wireless terminal 120 roaming in a visited network 110-1 connects through a home agent (HA) 180 of the home network 102 to a packet data network (PDN). The home agent 180 may be included in a gateway (GW) and establishes a logical location of the mobile wireless terminal 120. Packets ultimately destined for the mobile wireless terminal 120 are sent to the home agent 180, while packets from the mobile wireless terminal 120 will appear to originate from the home agent 180.

FIG. 3B shows an example of how the mobile wireless terminal 120 manages its mobility by using DSMIPv6. For example, with DSMIPv6, the mobile wireless terminal 120 is secured using a security protocol, such as Internet key exchange (IKEv2), which is the protocol used to set up a security association (SA) in the Internet Protocol Security (IPsec) suite. IPsec includes a suite of protocols for securing IP communications by authenticating and/or encrypting each IP packet in a data stream.

The mobile wireless terminal 120 may register a current location of the mobile wireless terminal 120 with the home network 102 and thus receive session continuity during roaming by using DSMIPv6. To register the current location, the mobile wireless terminal 120 may require a home address, a home agent address and a security association with the home agent 180. The procedure to obtain such information is referred to as "bootstrapping", and the mobile wireless terminal 120 may use various information protocols, such as Directory Name Service (DNS) or Dynamic Host Configuration Protocol (DHCP), to obtain such information dynamically during bootstrapping.

When the mobile wireless terminal 120 attaches to a visited network 110-1, the mobile wireless terminal 120 first performs layer 2 and layer 3 attach procedures. Layer 2 and layer 3 attach procedures are procedures of the Open Systems Interconnection Basic Reference Model (OSI Model). During the layer 2 and layer 3 attach procedures, the mobile wireless terminal 120 acquires a topology-correct IP address, commonly referred to as a care-of address (CoA). For the layer 2 attach procedure, the mobile wireless terminal 120 may establish a connection to an access router (AR) 182 within the visited network 110-1. In various implementations, additional access routers (not shown) may be present. The access router 182 may communicate with other networks, including the home network 102 and/or a corporate network (CN).

When the mobile wireless terminal 120 connects to the visited network 110-1, the mobile wireless terminal 120 performs authentication and authorization with the access router 182. This may include communicating with an authentication, authorization, and accounting (AAA) server in the home network 102. The AAA server may retrieve information based on an identifier of the mobile wireless terminal 120, such as a network address identifier, that uniquely identifies the mobile wireless terminal 120. The AAA server may indicate to the access router 182 whether the mobile wireless terminal 120 should be allowed access to the home network 102 and what services should be provided to the mobile wireless terminal 120.

Upon authentication, the mobile wireless terminal 120 receives a local address from the access router 182. Using this local address, the mobile wireless terminal 120 may implement layer 3 attach procedures to communicate with various network elements, including the home agent 180. The mobile wireless terminal 120 may then initiate a bootstrapping procedure by providing an access point name (APN) during either DHCP or DNS to obtain, for example, a home agent address. An access point name may include a logical name that identifies a Packet Data Network (PDN). The mobile wireless terminal 120 may include a list of access point names or other identifiers for various PDNs.

The mobile wireless terminal 120 may then establish a security association with the home agent 180 through, for example, IPSec IKEv2, in order to obtain a home address (HoA) from the home network 102. The mobile wireless terminal 120 may send the information of the CoA and HoA in a binding update message to the home agent 180. Upon receiving the binding update message, the home agent 180 may "bind" the CoA and the HoA in a binding cache. In one implementation, the home agent 180 creates a binding cache entry that records information about the mobile wireless terminal 120, including the current address of the mobile wireless terminal 120.

The home agent 180 may send a binding acknowledgement (Ack) message to notify the mobile wireless terminal 120 of the status of the binding update. The binding acknowledgement message may also include the HoA so that the mobile wireless terminal 120 is aware of a global home address assigned to the mobile wireless terminal 120. The mobile wireless terminal 120 may therefore "connect" to the home agent 180 via the exchange of the binding update and binding acknowledgement messages. The home agent 180 may use the binding cache entry to forward packets from destinations associated with the home network 102 to a current point of attachment of the mobile wireless terminal 120.

For example, packets sent from other network elements, such as other mobile wireless terminals, are sent to that HoA. The home agent 180 receives those packets and forwards the packets to the mobile wireless terminal 120. Similarly, packets from the mobile wireless terminal 120 are first forwarded to the home agent 180. The home agent 180 then forwards the packets with the source address of HoA. To allow for packets to be exchanged between the mobile wireless terminal 120 and the home agent 180, a tunnel may be established between the mobile wireless terminal 120 and the home agent 180.

Referring now to FIGS. 4A-4B, the mobile wireless terminal 120 may set up the connectivity to multiple PDNs 104-1, 104-2 (collectively referred to as PDNs 104) via multiple home agents in respective PDN GWs 316-1, 316-2 (collectively referred to as PDN GWs 316) using DSMIP. The timeline of FIG. 4B includes the mobile wireless terminal 120 attaching to each of the PDN GWs 316 via a procedure similar to the one shown in FIG. 3B. In other words, the mobile wireless terminal 120 uses separate DSMIP bootstrapping procedures to connect to each of the PDN GWs 316.

Each PDN GW 316 may include one or more home agents that each have respective addresses. However, for simplicity, the terms PDN GW and home agent may be used interchangeably herein. The mobile wireless terminal 120 may establish tunnels to either or both the home agents to route traffic to the appropriate home agent based on the service associated with that traffic. For example, one PDN 104-1 may be used to provide a service such as push e-mail, while another PDN 104-2 may be used to provide voice over internet protocol (VoIP) telephony.

SUMMARY

A network control module includes an access module that determines whether a first packet data network gateway communicating with a first packet data network also communicates with a second packet data network. The network control module also includes a selection control module in communication with a mobile wireless terminal. The mobile wireless terminal attempts to access the second packet data network by establishing a connection with a second packet data network gateway that communicates with the second packet data network. In response to the access module determining that the first packet data network gateway also communicates with the second packet data network, the selection control module commands the mobile wireless terminal to access the second packet data network through the first packet data network gateway.

In other features, the access is conducted prior to the mobile wireless terminal establishing the connection with the second packet data network gateway. The selection control module provides a signal that indicates that the first packet data network gateway and a previously acquired security association between the mobile wireless terminal and the first packet data network gateway are used to access the second packet data network. The selection control module generates the signal during an Internet key exchange between the mobile wireless terminal and the second packet data network gateway.

In other features, the selection control module defines configuration attributes that indicate that the first packet data network gateway communicates with the second packet data network. The selection control module provides a modified payload during the Internet key exchange. The modified payload includes the configuration attributes. A network system includes the network control module, the first packet data network gateway and the second packet data network gateway. The first packet data network gateway is different from the second packet data network gateway.

In other features, the first packet data network is different from the second packet data network and the mobile wireless terminal. The mobile wireless terminal connects to the first packet data network and the second packet data network using a host-based mobility protocol. At least one of a home subscriber server, an authentication authorization and accounting server, the first packet data network gateway and the second packet data network gateway includes the network control module. The first packet data network gateway communicates with a home network, and the second packet data network gateway communicates with a visited network where the mobile wireless terminal is roaming. The mobile wireless terminal connects to the second packet data network gateway by exchanging a binding update message and a binding acknowledgement message.

In other features, a wireless network system includes a first packet data network gateway that provides access to a first packet data network and a second packet data network. The first packet data network is different from the second packet data network. The system also includes a second packet data network gateway that provides access to the second packet data network. The first packet data network gateway is different from the second packet data network gateway. The system also includes a home network device comprising a network control module that is in communication with a mobile wireless terminal that is attempting to access the second packet data network through the second packet data network gateway. The network control module commands the mobile wireless terminal to access the second packet data network through the first packet data network gateway prior to the mobile wireless terminal connecting to the second packet data network gateway.

In other features, the home network device comprises at least one of a home subscriber server and an authentication, authorization and accounting server. The system also includes the mobile wireless terminal. The mobile wireless terminal connects to the first packet data network and the second packet data network using a host-based mobility protocol. The mobile wireless terminal further comprises a security module that acquires a security association with the first packet data network gateway for access to the first packet data network.

In other features, the mobile wireless terminal reuses the security association when accessing the second packet data network via the first packet data network gateway. The network control module provides a signal that indicates that the first packet data network gateway and the security association with the first packet data network gateway are reusable for access to the second packet data network. The mobile wireless terminal reuses the security association based on the signal. The network control module provides the signal during an Internet key exchange between the mobile wireless terminal and the second packet data network gateway.

In other features, the network control module defines configuration attributes indicating that the first packet data network gateway communicates with the second packet data network. The network control module provides a modified payload during the Internet key exchange. The modified payload includes the configuration attributes. The mobile wireless terminal accesses the second packet data network via the first packet data network gateway based on the modified payload.

In other features, the modified payload includes information for a plurality of packet data network gateways that allow access to the second packet data network and includes priority data that indicates an order for the mobile wireless terminal to communicate with the plurality of packet data network gateways. The mobile wireless terminal discovers the second packet data network gateway prior to attempting to access the second packet data network. The mobile wireless terminal attempts to connect to the second packet data network gateway prior to the network control module commanding the mobile wireless terminal to access the second packet data network using the first packet data network gateway.

In other features, the mobile wireless terminal includes an address determination module that discovers the second packet data network gateway when the mobile wireless terminal is attempting to access the second packet data network. The mobile wireless terminal accesses the second packet data network via the first packet data network gateway based on signals from the network control module. The mobile wireless terminal connects to the second packet data network gateway by exchanging a binding update message and a binding acknowledgement message. The first packet data network gateway communicates with a home network, and the second packet data network gateway communicates with a visited network where the mobile wireless terminal is roaming.

In other features, a method for operating a network control module includes determining whether a first packet data network gateway communicating with a first packet data network also communicates with a second packet data network. The method also includes accessing the second packet data network by establishing a connection between a mobile wireless terminal and a second packet data network gateway that communicates with the second packet data network. The method also includes the mobile wireless terminal accessing the second packet data network through the first packet data network gateway prior to the mobile wireless terminal establishing the connection with the second packet data network gateway. Accessing is performed in response to a determination that the first packet data network gateway also communicates with the second packet data network.

In other features, the method includes providing a signal that indicates that the first packet data network gateway and a previously acquired security association between the mobile wireless terminal and the first packet data network gateway are used to access the second packet data network. The method also includes generating the signal during an Internet key exchange between the mobile wireless terminal and the second packet data network gateway. The method also includes defining configuration attributes that indicate that the first packet data network gateway communicates with the second packet data network.

In other features, the method includes providing a modified payload during the Internet key exchange. The modified payload includes the configuration attributes. The method also includes connecting the mobile wireless terminal to the first packet data network and the second packet data network using a host-based mobility protocol. The method also includes connecting the mobile wireless terminal to the second packet data network gateway by exchanging a binding update message and a binding acknowledgement message.

In other features, a method for operating a wireless network system includes providing access to a first packet data network and a second packet data network via a first packet data network gateway. The first packet data network is different from the second packet data network. The method also includes providing access to the second packet data network via a second packet data network gateway. The first packet data network gateway is different from the second packet data network gateway. The method also includes communicating with a mobile wireless terminal that is attempting to access the second packet data network through the second packet data network gateway. The method also includes commanding the mobile wireless terminal to access the second packet data network through the first packet data network gateway prior to the mobile wireless terminal connecting to the second packet data network gateway.

In other features, the method includes connecting the mobile wireless terminal to the first packet data network and the second packet data network using a host-based mobility protocol. The method also includes acquiring a security association with the first packet data network gateway for access to the first packet data network. The method also includes reusing the security association when accessing the second packet data network via the first packet data network gateway. The method also includes providing a signal that indicates that the first packet data network gateway and the security association with the first packet data network gateway are reusable for access to the second packet data network.

In other features, the method includes reusing the security association based on the signal. The method also includes providing the signal during an Internet key exchange between the mobile wireless terminal and the second packet data network gateway. The method also includes defining configuration attributes indicating that the first packet data network gateway communicates with the second packet data network.

The method also includes providing a modified payload during the Internet key exchange. The modified payload includes the configuration attributes. The method also includes accessing the second packet data network via the first packet data network gateway based on the modified payload.

In other features, a network control module includes access means for determining whether a first packet data network gateway communicating with a first packet data network also communicates with a second packet data network. The network control module also includes selection control means for communicating with a mobile wireless terminal. The mobile wireless terminal attempts to access the second packet data network by establishing a connection with a second packet data network gateway that communicates with the second packet data network. In response to the access means determining that the first packet data network gateway also communicates with the second packet data network, the selection control means commands the mobile wireless terminal to access the second packet data network through the first packet data network gateway.

In other features, the access is conducted prior to the mobile wireless terminal establishing the connection with the second packet data network gateway. The selection control means provides a signal that indicates that the first packet data network gateway and a previously acquired security association between the mobile wireless terminal and the first packet data network gateway are used to access the second packet data network. The selection control means generates the signal during an Internet key exchange between the mobile wireless terminal and the second packet data network gateway.

In other features, the selection control means defines configuration attributes that indicate that the first packet data network gateway communicates with the second packet data network. The selection control means provides a modified payload during the Internet key exchange. The modified payload includes the configuration attributes. A network system includes the network control module, the first packet data network gateway and the second packet data network gateway. The first packet data network gateway is different from the second packet data network gateway.

In other features, the first packet data network is different from the second packet data network and the mobile wireless terminal. The mobile wireless terminal connects to the first packet data network and the second packet data network using a host-based mobility protocol. At least one of a home subscriber server, an authentication authorization and accounting server, the first packet data network gateway and the second packet data network gateway includes the network control module. The first packet data network gateway communicates with a home network, and the second packet data network gateway communicates with a visited network where the mobile wireless terminal is roaming. The mobile wireless terminal connects to the second packet data network gateway by exchanging a binding update message and a binding acknowledgement message.

In other features, a wireless network system includes a first packet data network gateway that provides access to a first packet data network and a second packet data network. The first packet data network is different from the second packet data network. The system also includes a second packet data network gateway that provides access to the second packet data network. The first packet data network gateway is different from the second packet data network gateway. The system also includes home network means for communicating comprising network control means for communicating with a mobile wireless terminal that is attempting to access the second packet data network through the second packet data network gateway. The network control means commands the mobile wireless terminal to access the second packet data network through the first packet data network gateway prior to the mobile wireless terminal connecting to the second packet data network gateway.

In other features, the home network device comprises at least one of a home subscriber server and an authentication, authorization and accounting server. The system also includes the mobile wireless terminal. The mobile wireless terminal connects to the first packet data network and the second packet data network using a host-based mobility protocol. The mobile wireless terminal further comprises security means for acquiring a security association with the first packet data network gateway for access to the first packet data network.

In other features, the mobile wireless terminal reuses the security association when accessing the second packet data network via the first packet data network gateway. The network control means provides a signal that indicates that the first packet data network gateway and the security association with the first packet data network gateway are reusable for access to the second packet data network. The mobile wireless terminal reuses the security association based on the signal. The network control means provides the signal during an Internet key exchange between the mobile wireless terminal and the second packet data network gateway.

In other features, the network control means defines configuration attributes indicating that the first packet data network gateway communicates with the second packet data network. The network control means provides a modified payload during the Internet key exchange. The modified payload includes the configuration attributes. The mobile wireless terminal accesses the second packet data network via the first packet data network gateway based on the modified payload.

In other features, the modified payload includes information for a plurality of packet data network gateways that allow access to the second packet data network. The modified payload also includes priority data that indicates an order for the mobile wireless terminal to communicate with the plurality of packet data network gateways. The mobile wireless terminal discovers the second packet data network gateway prior to attempting to access the second packet data network. The mobile wireless terminal attempts to connect to the second packet data network gateway prior to the network control module commanding the mobile wireless terminal to access the second packet data network using the first packet data network gateway.

In other features, the mobile wireless terminal comprises address determination means for discovering the second packet data network gateway when the mobile wireless terminal is attempting to access the second packet data network. The mobile wireless terminal accesses the second packet data network via the first packet data network gateway based on signals from the network control means. The mobile wireless terminal connects to the second packet data network gateway by exchanging a binding update message and a binding acknowledgement message. The first packet data network gateway communicates with a home network, and the second packet data network gateway communicates with a visited network where the mobile wireless terminal is roaming.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein:

FIG. 3A is a functional block diagram of a wireless communications system according to the prior art;

FIG. 3B is a timeline of an implementation of mobility according to the prior art;

FIG. 6A is a block diagram that illustrates a security payload according to the prior art;

FIG. 6B is a block diagram that illustrates a security payload according to the present disclosure;

FIG. 7 is a chart of configuration attributes for a security payload according to the present disclosure;

FIG. 8 is a chart of notification messages for a security payload according to the present disclosure;

DESCRIPTION

Figure 1:
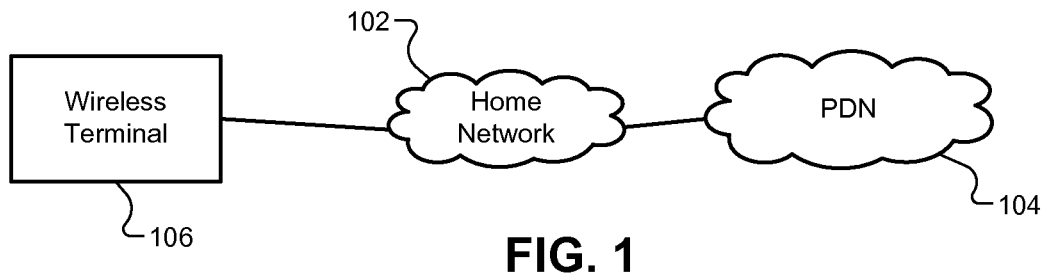
FIG. 1 is a functional block diagram of a wireless communications system according to the prior art.
Figure 2:
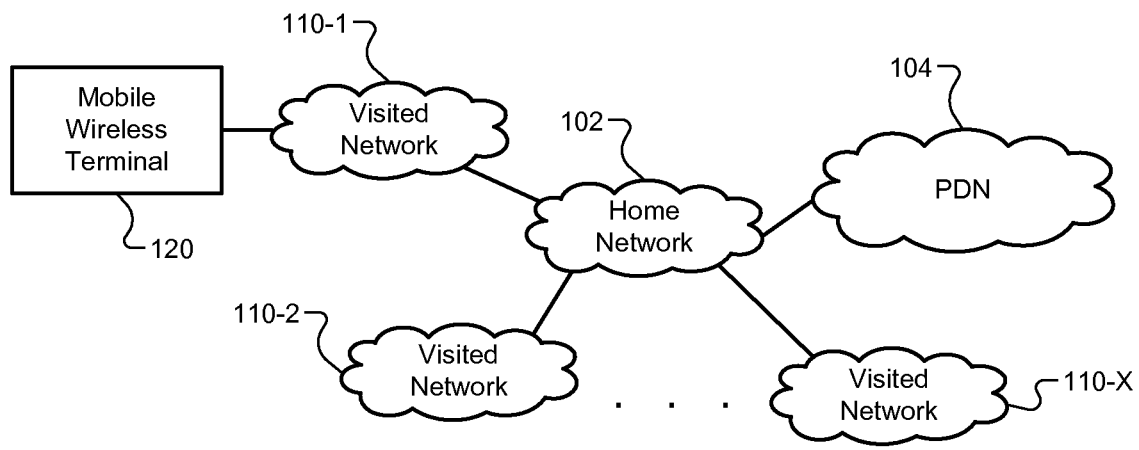
FIG. 2 is a functional block diagram of a wireless communications system offering mobility according to the prior art.
Figure 4A:
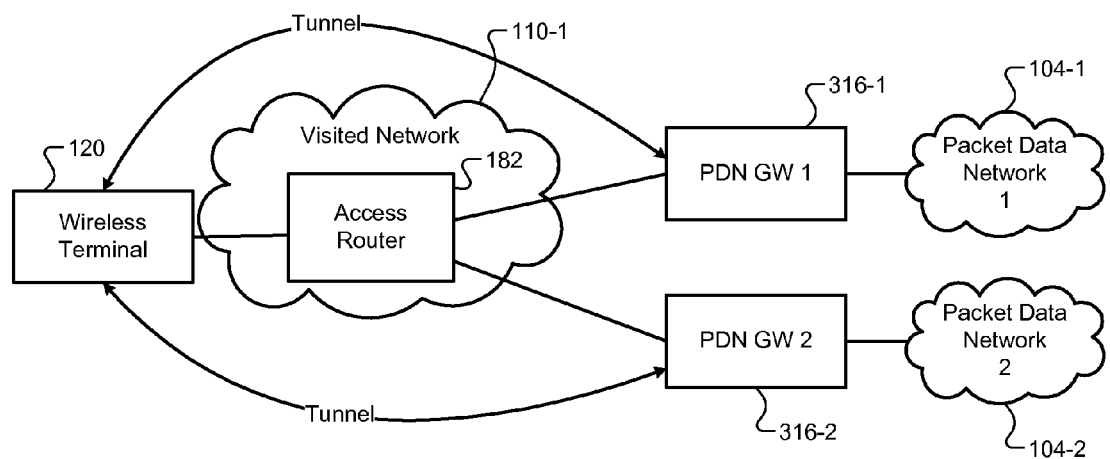
FIG. 4A is a functional block diagram of a wireless communications system according to the prior art.
Figure 4B:
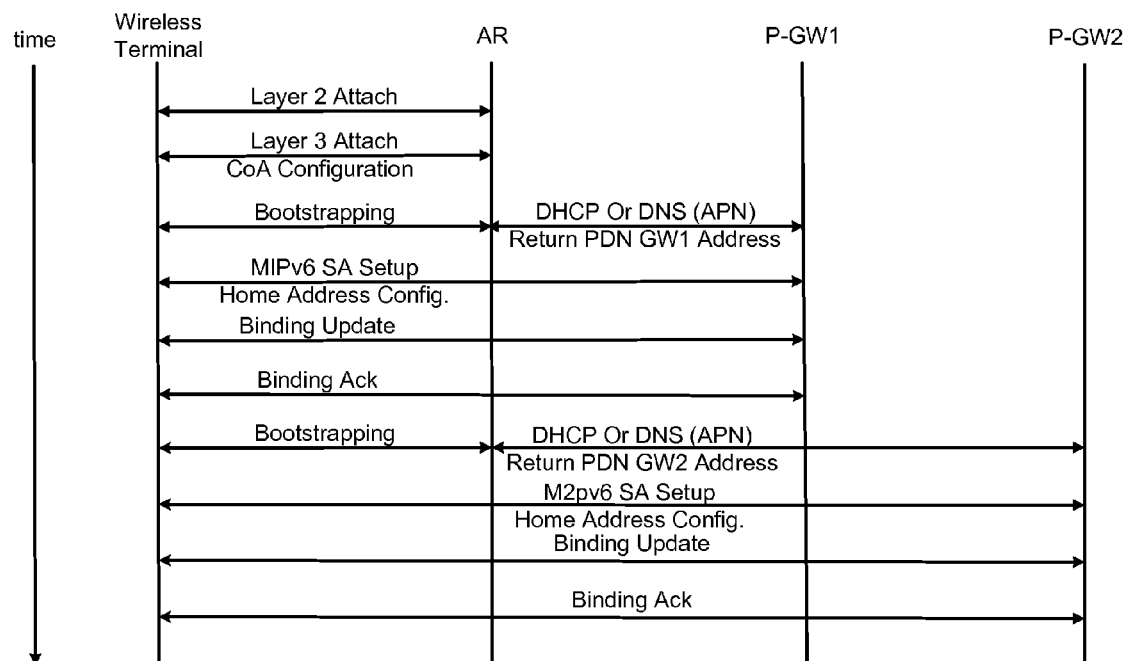
FIG. 4B is a timeline of an implementation of mobility according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. In the following description, mobile wireless terminal may refer to a service request device (SRD), user equipment (UE) and/or a mobile node. A mobile wireless terminal may include equipment of an end user, such as a processor, a radio interface adaptor, etc. A mobile wireless terminal may also include a mobile network device, a personal data assistant (PDA), a computer, etc.

Also, in the following description, the term mobility protocol may include a local mobility protocol and/or a global mobility protocol. A local mobility protocol may refer to a communication protocol used for mobility by a mobile wireless terminal between access points of a home network, e.g., a home public land mobile network (hPLMN). The access points are in communication with different access routers. A global mobility protocol refers to a communication protocol used for mobility by a mobile wireless terminal between access points of different networks. The different networks may be different PLMNs, such as a visited PLMN (vPLMN). The PLMNs may be $3^{rd}$ Generation Partnership Project (3GPP™) system networks.

The present disclosure includes a device that communicates with a mobile wireless terminal when the mobile wireless terminal is attempting to gain connectivity with a packet data network (PDN). The network device provides an indication to the mobile wireless terminal as to which PDN gateway (PDN GW) may provide the connectivity. Various network devices, such as a PDN GW and/or home subscriber servers and authentication authorization and accounting servers (HSS/AAA), may include one or more network control modules that provide the indication.

For example, a first PDN GW may allow connectivity to multiple PDNs. The mobile wireless terminal may initially establish a security association (SA), such as IPSec, with the first PDN GW to connect to a first PDN. The mobile wireless terminal may subsequently attempt to connect to a second PDN via a second PDN GW. The network device, which may include the second PDN GW, may signal the mobile wireless terminal to reuse the previously established SA with the first PDN GW in order to communicate with a second PDN. The mobile wireless terminal therefore does not need to establish a second SA with a second PDN GW to communicate with the second PDN. Reuse of the security association avoids the overhead and delay that may result from running security procedures, such as the Internet key exchange (IKEv2) procedure, with multiple PDN GWs. In other words, reuse of the existing security association may be implemented in order to reduce signaling overhead and latency due to setting-up of connectivity. Reuse of the security association may be based on a policy of the home network operator (where the HSS/AAA reside) and/or of the network (home or a visited) where the PDN GWs are located.

Figure 5A:
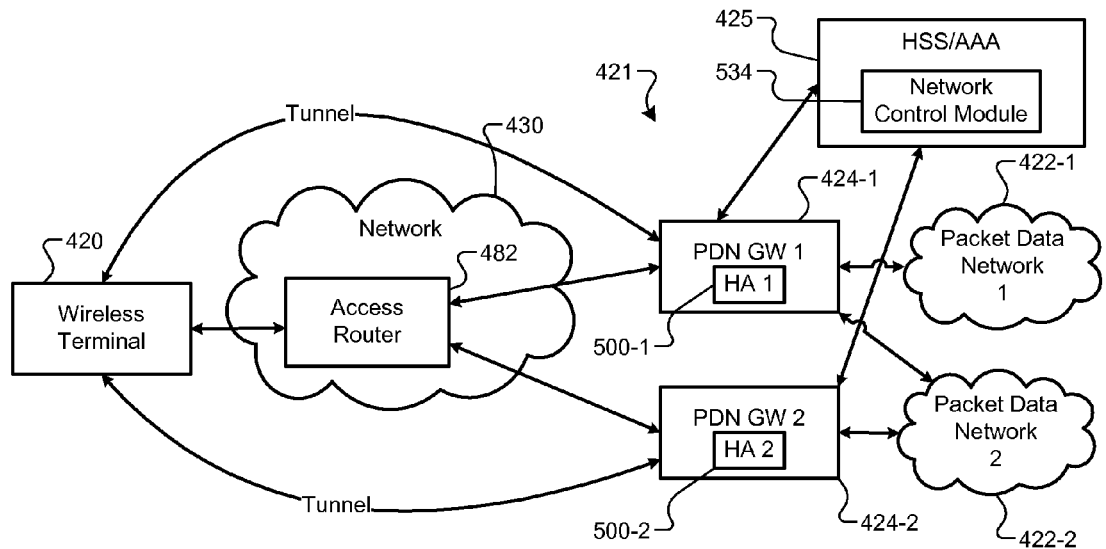
FIG. 5A is a functional block diagram of a wireless communications system according to the present disclosure.

Referring now to FIG. 5A, a mobile wireless terminal 420 includes mobility features that allow it to communicate with a plurality of PDNs of a network system 421. For purposes of example, two PDNs 422-1, 422-2 (collectively referred to as PDNs 422) are illustrated. The mobility features allow the mobile wireless terminal 420 to communicate with the PDNs 422 via one or more PDN GWs 424-1, 424-2 (collectively referred to as PDN GWs 424). Each PDN GW 424 may reside in and/or communicate with one or more networks 430.

The mobile wireless terminal 420 may be preprogrammed with the addresses of the first and second PDN GWs 424-1. Alternatively, the identities of the first and second PDN GWs 424-1 may be determined from a profile for the mobile wireless terminal 420. This profile may be stored remotely in the HSS/AAA 425.

Figure 5C:
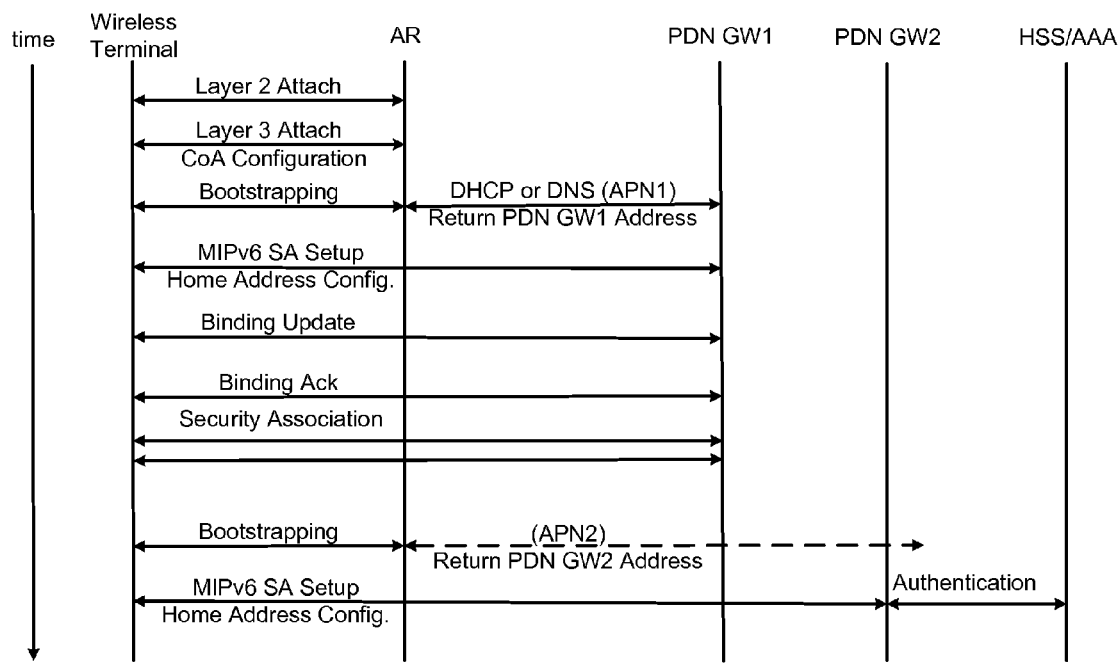
FIG. 5C is a timeline of an implementation of mobility according to the present disclosure.
Figure 5B:
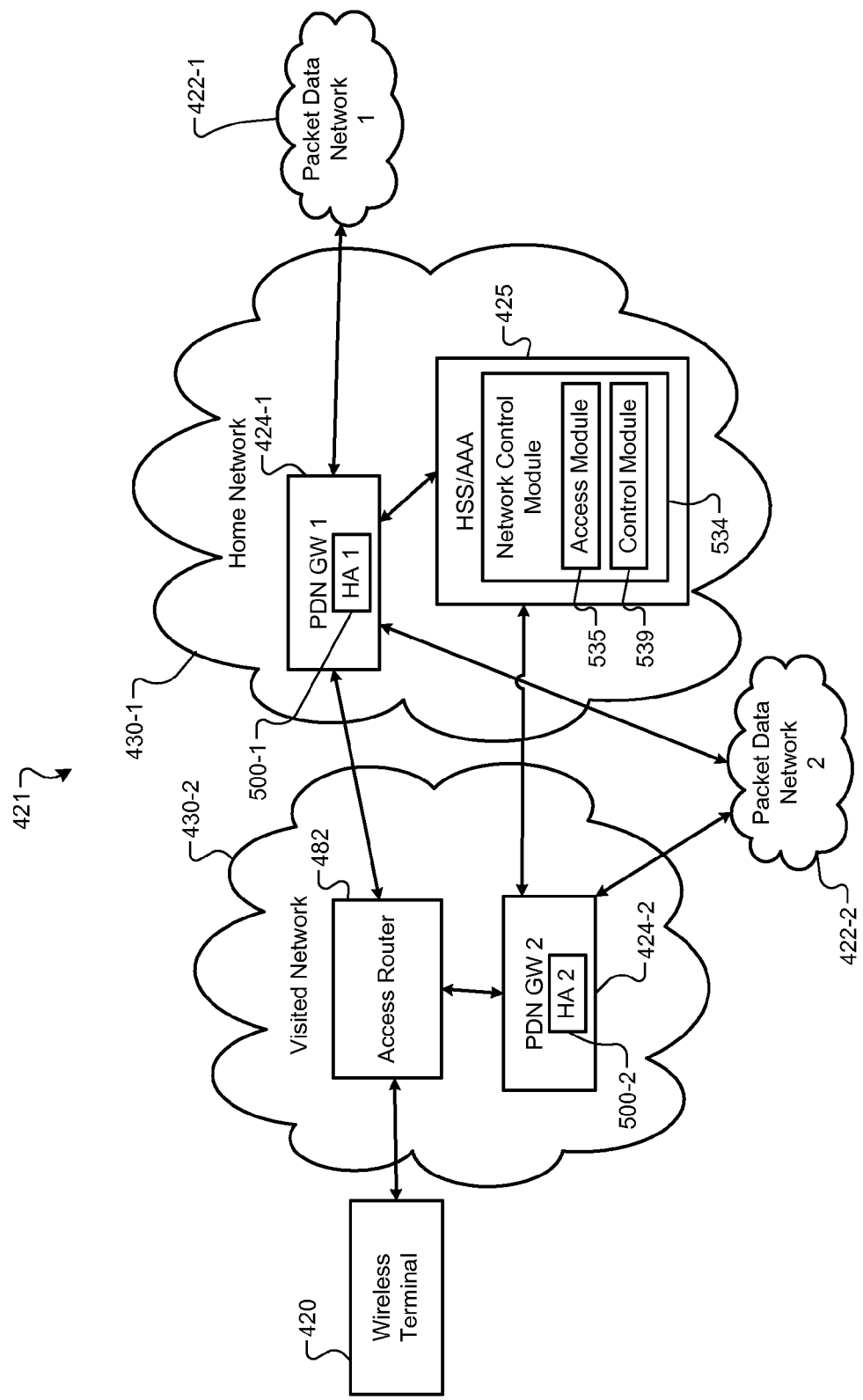
FIG. 5B is a functional block diagram of a wireless communications system according to the present disclosure.

Referring now to FIG. 5B, the networks 430 may include a home network 430-1 and/or visited network 430-2. For example, a first PDN GW 424-1 may communicate with the home network 430-1, and a second PDN GW 424-2 may communicate with the visited network 430-2.

Referring now to FIG. 5C, the mobile wireless terminal 420 may use a host-based IP when handling mobility management. A mobility protocol may include a mobile IP (MIP), which may refer to a host-based IP or a network-based IP. Dual stack mobile IP (DSMIP) is an exemplary host-based mobility protocol. Several versions are available, such as DSMIPv4 and DSMIPv6, which are incorporated by reference in there entirety. DSMIPv6 is discussed herein as an example of a DSMIP protocol.

Figure 5D:
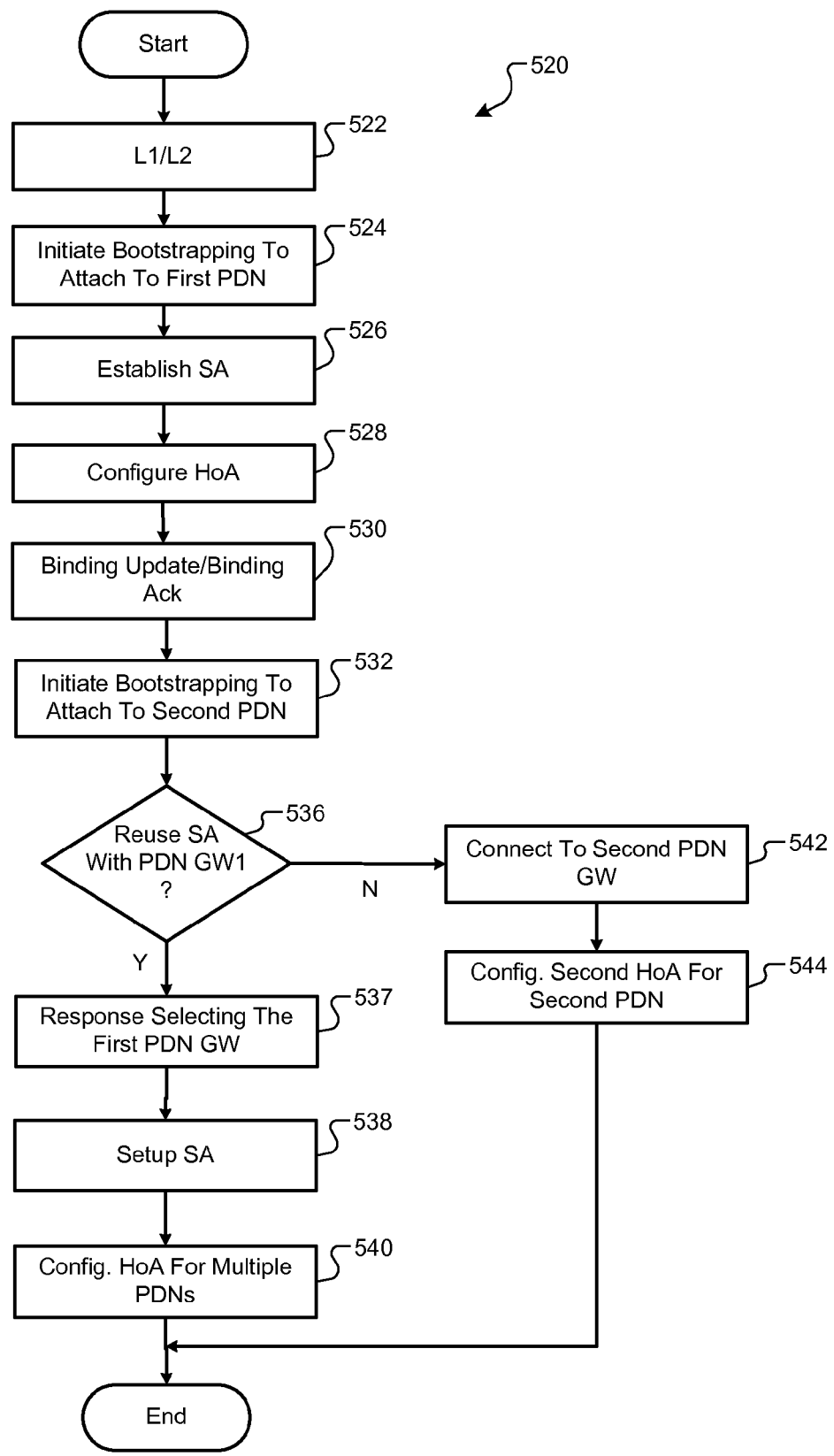
FIG. 5D is a logic flow diagram of a method for implementing host-based mobility according to the present disclosure.

Referring now to FIG. 5D, a logic flow diagram 520 illustrates the timeline of FIG. 5C. In step 522, when the mobile wireless terminal 420 attaches to a visited network 430-2, the mobile wireless terminal 420 first performs layer 2 and layer 3 attach procedures. During the layer 2 and layer 3 attach procedures, the mobile wireless terminal 420 acquires a topology-correct IP, also referred to as a care-of address (CoA). For the layer 2 attach procedure, the mobile wireless terminal 420 may establish a connection to an access router (AR) 482 within the visited network 430-2. The access router 482 may then provide the CoA during the layer 3 attach procedure.

The PDN GWs 424 may include respective home agents (HA) 500-1, 500-2 (collectively referred to as home agents 500). The home agents 500 establish a logical location of the mobile wireless terminal 420. For example, packets ultimately destined for the mobile wireless terminal 420 are sent to the home agent 500-1, while packets from the mobile wireless terminal 420 will appear to originate from the home agent 500-1. For purposes of example, the PDN GWs 424 each include a single home agent 500, and therefore the terms PDN GW and home agent may be used interchangeably herein. However, the PDN GWs 424 may each include one or more home agents 500.

The mobile wireless terminal 120 manages mobility by using, for example, DSMIPv6. The mobile wireless terminal 420 is secured to the home network 430-1 using a security protocol, such as IKEv2, which is the protocol used to set up a security association in the Internet Protocol Security (IPsec) suite. IPsec includes a suite of protocols for securing IP communications by authenticating and/or encrypting each IP packet in a data stream.

The mobile wireless terminal 420 may register a current location of the mobile wireless terminal 420 with the home network 430-1 and thus receive session continuity during roaming by using DSMIP. To register the current location, the mobile wireless terminal 120 may require a home address, a home agent address and a security association with the first home agent 500-1. In step 524, the aforementioned required data may be acquired through, for example, a bootstrapping operation. The mobile wireless terminal 420 may also use various information protocols, such as Directory Name Service (DNS) or Dynamic Host Configuration Protocol (DHCP) during bootstrapping to dynamically obtain the required data.

Previously, mobile wireless terminals acquired information relating to a first PDN GW through bootstrapping, selected the first PDN GW and set up connectivity to a first PDN. The information of the first PDN GW was stored in a network entity, such as HSS/AAA. The mobile wireless terminal would subsequently attempt to establish a second connectivity to a second PDN using a host-based mobility protocol. However, the mobile wireless terminal would have to run the bootstrapping procedure again with a second PDN GW to set up connectivity to the second PDN.

According to the present disclosure, each PDN 422 may be identified by an access point name (APN). For example, a corporate network and the Internet may be identified by different access point names and may correspond to different PDNs. The mobile wireless terminal 420 may be preconfigured with various access point names that are used when the mobile wireless terminal 420 desires access to various services. The mobile wireless terminal may provide a first access point name during the bootstrapping procedure and set up a MIP6 SA with the first PDN GW 424-1.

In step 526, the mobile wireless terminal 420 may establish a SA with the PDN GW 424-1 through, for example, IPSec IKEv2, in order to obtain a home address (HoA) from the home network 430-1 in step 528. In step 530, the mobile wireless terminal 420 may send the information of the CoA and HoA in a binding update message to the PDN GW 424-1. Upon receiving the binding update message, the PDN GW 424-1 may "bind" the CoA and the HoA in a binding cache. In other words, the PDN GW 424-1 may create a binding cache entry that records information about the mobile wireless terminal 420, including the current address of the mobile wireless terminal 420.

The PDN GW 424-1 may send a binding acknowledgement (Ack) message to notify the mobile wireless terminal 420 of the status of the binding update. The binding acknowledgement message may also include the HoA so that the mobile wireless terminal 420 is aware of its global home address. The PDN GW 424-1 may use the binding cache entry to forward packets from destinations associated with the home network 430-1 to a current point of attachment of the mobile wireless terminal 420. The mobile wireless terminal 420 may therefore "connect" to the PDN GW 424-1 via the exchange of the binding update and binding acknowledgement messages.

The mobile wireless terminal 420 thus establishes connectivity to the first PDN 422-1. For example, packets sent from other network elements, such as other mobile wireless terminals, are sent to that HoA. The home agent 180 receives those packets and forwards them to the mobile wireless terminal 420. Similarly, packets from the mobile wireless terminal 420 are first forwarded to the PDN GW 424-1. The PDN GW 424-1 then forwards the packets with the source address of HoA. To allow for packets to be exchanged between the mobile wireless terminal 420 and the PDN GW 424-1, a tunnel may be established between the mobile wireless terminal 420 and the PDN GW 424-1.

In step 532, the mobile wireless terminal 420 may attempt to gain connectivity to a second PDN 422-2 and may initiate a second bootstrapping procedure. For example, the mobile wireless terminal 420 may initiate set-up of the MIPv6 SA with the second PDN GW 424-2. The mobile wireless terminal 420 may be aware of a PDN GW 424-2 that may allow connectivity to the second PDN 422-2. Alternatively, the mobile wireless terminal 420 may provide a second access point name during the second bootstrapping procedure in order to discover the second PDN GW 424-2. Alternatively, the mobile wireless terminal 420 may independently select the address for the second PDN GW 424-2 based on a preference. The discovered PDN GW 424-2 may be different from the first PDN GW 424-1.

In step 536, a network device, such as the HSS/AAA 425 and/or PDN GWs 424, may include a network control module 534. The network control module 534 may, for example, receive the second access point name from the mobile wireless terminal 420. The network control module 534 may include an access module 535 that determines that the mobile wireless terminal 420 already has a SA with the first PDN GW 424-1. For example, after the second PDN GW 424-2 receives data from the mobile wireless terminal 420, the second PDN GW 424-2 may contact the network control module 534. The access module 535 may then determine that the first PDN GW 424-1 may allow communications to the PDN that corresponds to the second access point name. The network control module 534 may also include a selection control module 539 that selectively issues a response to the mobile wireless terminal 420 and/or the second PDN GW 424-2 in step 537. The response may indicate which PDN GW 424 is to provide connectivity to the second PDN 422-2.

For example, the second PDN GW 424-2 may be informed by the response that the first PDN GW 424-1 is able to provide the connectivity to the second PDN 422-2 identified by the second access point name. The response may convey information to the mobile wireless terminal 420 that the mobile wireless terminal 420 may use the selected PDN GW 424-1 to establish connectivity to the second PDN 422-2. The network control module 534 conveys the response before the mobile wireless terminal 420 has established connectivity to the discovered PDN GW 424-2. The response may be conveyed via an IKEv2 payload when the DSMIPv6 bootstrapping takes place using IKEv2 and IPSec. During the procedure to set up the second DSMIPv6 SA, the second PDN GW 424-2 may inform the mobile wireless terminal 420 of the response.

In step 538, the mobile wireless terminal 420 sets up a security association with the first PDN GW 424-1. The mobile wireless terminal 420 may acquire security association information from the HSS/AAA 425 when the mobile wireless terminal 420 sets up the connectivity with the first PDN GW 424-1. The security association information may be carried via communications between the mobile wireless terminal 420 and one or more of the PDN GWs 424 and/or access router 482.

In step 540, the mobile wireless terminal 420 may access both PDNs 422 by configuring one home address. Multiple PDNs 422 can be served by a single PDN GW 424-1 and share the same IP address space. Therefore, the mobile wireless terminal 420 may be configured with one IP address to access both PDNs 422.

In step 542, the network control module 534 may determine that the security association with the first PDN GW 424-2 may not be reused and may instead selectively allow the mobile wireless terminal 420 to setup a security association with the second PDN GW 424-2. In step 544, the mobile wireless terminal 420 may configured a separate home address for each of the PDNs 422.

Referring now to FIGS. 6A-6B, a standard payload for IKEv2 (FIG. 6A), and an example of a modified payload for IKEv2 (FIG. 6B), which may be referred to as a PDN GW address payload, are illustrated. When the mobile wireless terminal 420 and the second PDN GW 424-2 initiate security exchanges, such as using IKEv2, the network control module 425 may modify an IKEv2 payload that is to be sent to the mobile wireless terminal 420. The modified payload may indicate which PDN GW the mobile wireless terminal 420 may use. FIG. 6A illustrates a payload 598 according to the prior art. The payload 598 includes various fields, such as Next Payload, Reserved bits, Payload Length, ID type and Configuration Attributes. Each IKE message begins with an IKE header followed by or more IKE payloads. Each payload may be identified by a "Next Payload" field in the preceding payload. The payload 598 includes space set aside for configuration attributes. Configuration attributes provide information as to how the payload is configured.

The network control module 534 may define configuration attributes for the payload 598 so that data may be exchanged during IKE exchanges. For example, the network control module 534 may define a configuration attribute to request/return a PDN GW address in the configuration payloads defined in IKEv2, such as CFG_REQUEST/CFG_REPLY and CFG_SET/CFG_ACK. Exemplary configuration attributes defined for the payload may define the version of the DSMIP that is being used for each respective PDN GW 424.1-N PDN GW IP addresses for the PDN GWs 424 are illustrated for purposes of example to illustrate that any number of PDN GW addresses may be provided as configuration attribute in the payload 598.

The payload 600 may include the IP addresses of one or more PDN GWs 424. The payload 600 may include common fields defined in IKEv2 and additional fields to indicate the number of PDN GW addresses, each PDN GW address suggested and IP version information for each PDN GW address. If there are multiple PDN GW addresses in the payload 600, an additional field, such as priority, may be used by the network control module 534 to assist the mobile wireless terminal 420 in selecting a PDN GW address. The mobile wireless terminal 420 may receive and analyze the payload 600. For example, the mobile wireless terminal 420 may include a security database, such as a Security Association Database (SAD). The mobile wireless terminal 420 may compare the content of the PDN GW address payload 600 to entries in the Security Association Database. If multiple entries are returned, the mobile wireless terminal 420 may check whether there is one entry that meets requirements for securing the DSMIPv6 signaling message. For example, since the mobile wireless terminal 420 has already established a security association with the first PDN GW 424-1, the mobile wireless terminal 420 may reuse the security association based on the first PDN GW 424-1 identified in the payload 600.

Referring now to FIG. 7, a table 700 includes exemplary configuration attributes for the payload 598. For example, a network device, such as the network control module 534, may select one of the attribute types of the table 700, which may be stored in the HSS/AAA 425, to define configuration attributes for the payload 598. For example, one type (INTERNAL_PDNGW_IP4_ADDRESS) may indicate that IPv4 may be used for a particular PDN GW another type (INTERNAL_PDNGW_IP6_ADDRESS) may indicate that IPv6 may be used for a particular PDN GW.

Referring now to FIG. 8, instead of selecting configuration attributes of a payload, as in FIG. 6A, the network control module 534 may provide an additional payload that selects the first PDN GW 424-1 for communications with the second PDN 422-2. The network control module 534 may also provide a notification of the additional payload. For example, a table 710 includes exemplary notification message types that indicate an additional payload.

The mobile wireless terminal 420 may process the IKEv2 payload and/or attribute type of the PDN GW address that contains a PDN GW IP address to be used. Further, the PDN GW 424-2 may generate an extended IKEv2 message with the payload or attribute type of PDN GW address based on signals from the network control module 534. The extended IKEv2 message may indicate that another PDN GW 424-1 may be used to establish the connectivity to the requested PDN 422-2.

Figure 9:
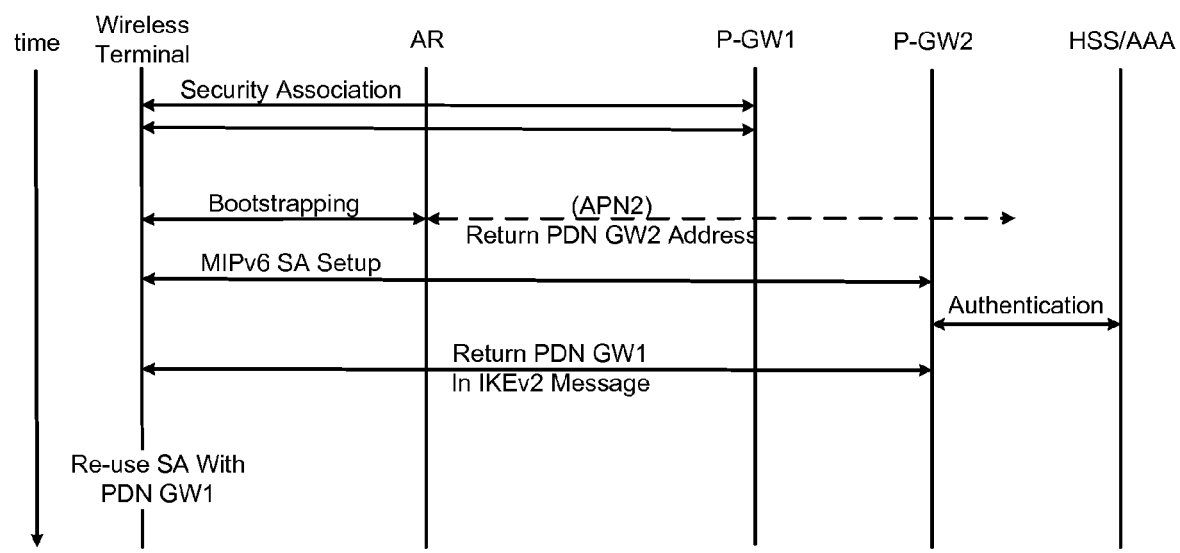
FIG. 9 is a timeline of an implementation of mobility according to the present disclosure.

Referring now to FIG. 9, a timeline illustrates an embodiment in which the mobile wireless terminal 420 receives an indication in the extended IKEv2 message. The indication identifies a different PDN GW (e.g., the first PDN GW 424-1) than the one with which the mobile wireless terminal 420 originally attempted to connect. The mobile wireless terminal 420 receives the indication from the PDN GW that was discovered during the bootstrapping procedure, such as the second PDN GW 424-2 in response to an assertion of an access point name, such as the second access point name. The mobile wireless terminal 420 then reuses the existing security association with the first PDN GW 424-1 to establish the connectivity to the second PDN 422-2 identified by the asserted access point name. The mobile wireless terminal 420 may establish connectivity to the second PDN 422-2 using a procedure similar to FIG. 3B.

In other words, the mobile wireless terminal 420 may provide a first APN during a first bootstrapping procedure and may set up a MIPv6 SA with the first PDN GW 424-1. The mobile wireless terminal 420 may subsequently attempt to establish connectivity to the PDN identified by the second access point name (i.e., additional PDN connectivity). The mobile wireless terminal 420 may discover the second PDN GW 424-2, which may serve the requested PDN 422-2, by broadcasting the second access point name during the bootstrapping procedure. The mobile wireless terminal 420 may also initiate the MIPv6 SA with the second PDN GW 424-2 by initiating the IKEv2 procedure.

During the IKEv2 procedure, the second PDN GW 424-2 may contact the HSS/AAA 425. The HSS/AAA 425 may authorize the mobile wireless terminal 420 to connect to the second PDN GW 424-2. The HSS/AAA 425 may store the address of the second PDN GW 424-2 and the second APN that may be provided by the mobile wireless terminal 420. The HSS/AAA 425 may contain the information of the first PDN GW 424-1 (i.e., the first PDN GW address and the first access point name).

The network control module 534 may therefore determine that the first PDN GW 424-1 is able to provide the connectivity to the PDN identified by the second access point name based on information in the HSS/AAA 425. The network control module 534 may also determine that the mobile wireless terminal 420 has already set up a security association with the first PDN GW 424-1 based on information in the HSS/AAA 425. The network control module 534 may make the determinations when receiving the address of the second PDN GW 424-2 and/or the second access point name. The network control module 534 may also determine that the first and second access point names may be served by the same PDN GW 424-1, and that the address of the second PDN GW 424-2 is different from the address of the first PDN GW 424-1. Therefore, network control module 534 may determine that the first and second access point names may be served by the same PDN GW 424-1, and that first APN is already served by the first PDN GW 424-1.

The second PDN GW 424-2 may instruct the mobile wireless terminal 420 to reuse the existing SA with the first PDN GW 424-1 and to use the first PDN GW 424-1 for connectivity to the PDN 422-2 identified by the second APN. The content of the IKEv2 message may provide instructions sent to the mobile wireless terminal 420 during the IKE procedure may be represented as follows: IKE header (HDR), security Identification response certification (SK {IDr, [CERT]), PDN_GW_Address, authorization (AUTH). The field "PDN_GW_Address" may include the PDN GW address of the PDN GW—i.e., the first PDN GW 424-1 suggested by the network control module 534. The second PDN GW 424-2 may deny a request of a second security association if presented by the mobile wireless terminal 420 to prevent establishment of an security association with the mobile wireless terminal 420.

When the mobile wireless terminal 420 receives the IKEv2 message, the mobile wireless terminal 420 stops the IKEv2 procedure with the second PDN GW 424-2 and looks-up the security association established with the first PDN GW 424-1. If found, the mobile wireless terminal 420 reuses the existing IPSec SA with the first PDN GW 424-1 and gains the connectivity to the PDN 422-2 identified by the second access point name.

The mobile wireless terminal 420 is therefore able to authenticate the identity of the second PDN GW 424-2 during the IKE procedure. This authentication may minimize risk of spoofing attacks. Also, the mobile wireless terminal 420 configures applications needed to implement connectivity to the PDN 422-2 that is identified by the second APN. The configured applications may allow use of the IP address that the mobile wireless terminal 420 obtained when establishing connectivity to the PDN 422-1 that was identified by the first access point name.

Figure 10:
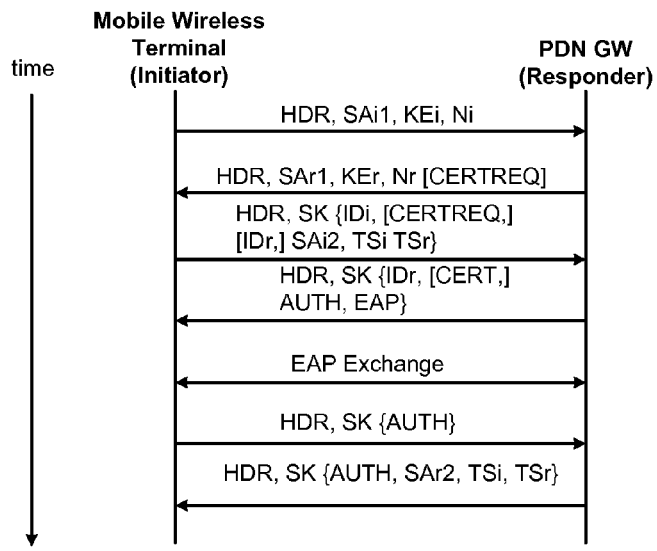
FIG. 10 is a timeline of security exchanges according to the present disclosure.

Referring now to FIG. 10, the IKE procedure for Extensible Authentication Protocol (EAP) authentication is illustrated. EAP fields are defined in RFC 4187, "Extensible Authentication Protocol Method for 3rd Generation Authentication and Key Agreement (EAP-AKA)" and RFC 3748, "Extensible Authentication Protocol (EAP)", the disclosures of which are incorporated herein in their entirety. The network control module 534 may provide information to the mobile wireless terminal 420 in EAP exchanges as to which PDN GW may be used for a particular PDN.

For example, EAP data may be exchanged during authentication of the mobile wireless terminal 420 with the first PDN GW 424-1. For EAP, an initiating device, here the mobile wireless terminal 420 sends a message to a responding device, here the PDN GW 424-1. The message may include a header (HDR), an initiator SA (SAi1), an initiator key exchange (KEi) and an initiator notification (Ni).

The PDN GW 424-1 may respond with a HDR, a responder SA (SAr1), a responder key exchange (KEr), a responder notification (Nr) and a certificate request (CERTREQ). Subsequent data may be encrypted. The notation SK { . . . } indicates that the payloads are encrypted and integrity protected. The mobile wireless terminal 420 may then assert its identity (IDi) and may provide traffic selectors for itself (TSi) and the PDN GW 424-1 (TSr). The PDN GW 424-1 may then assert its identity with the IDr payload and send one or more certificates (CERT) that may include a public key used to verify AUTH. The PDN GW 424-1 may also initiate an EAP exchange. In the present disclosure, EAP fields may be reused to indicate to the mobile wireless terminal 420 the suggested PDN GW address. The network control module 534 may instruct the PDN GWs to reuse EAP fields.

Figure 11:
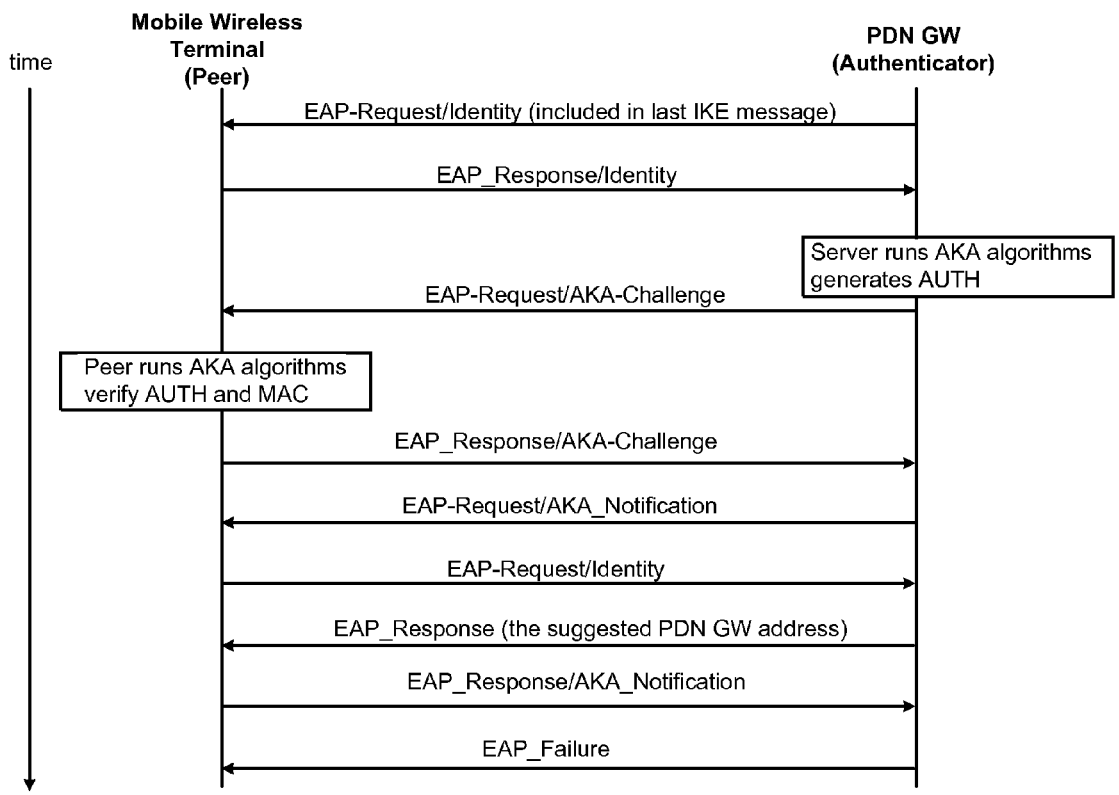
FIG. 11 is a timeline of an implementation of security exchanges according to the present disclosure.

Referring now to FIG. 11, the EAP authentication procedure is further illustrated. The second PDN GW 424-2, which may be controlled by the network control module 534, may pass the received EAP message to a backend server, such as the HSS/AAA 425, for authentication. For EAP authentication, the second PDN GW 424-2 may request the identity of the mobile wireless terminal in the last IKE message. The mobile wireless terminal 420 may provide a response including identification information. The second PDN GW 424-2 may then run Authentication and Key Agreement (AKA) algorithms and may generate an authorization. The second PDN GW 424-2 then provides a request to verify the mobile wireless terminal 420 is authorized.

The mobile wireless terminal 420 then runs AKA algorithms and verifies authorization and media access control. The mobile wireless terminal 420 responds with the authorization verification. The second PDN GW 424-2 may determine that the first PDN GW may be reused for connectivity to the requested PDN. The second PDN GW 424-2 then sends a notification (EAP-Request/AKA_Notification) to indicate that the service is temporarily denied, i.e., Notification Code=1026. After receiving the denial, the mobile wireless terminal 420 sends a request (EAP-Request/Identity) to request the suggested PDN GW address. The second PDN GW 424-2 returns the address of the first PDN GW 424-1 in the response message (EAP_Response). The mobile wireless terminal 420 sends the response notification (EAP_Response/AKA_Notification) to respond to the previous notification message. The second PDN GW 424-2 sends a failure message (EAP_Failure) to finish the EAP procedure with the mobile wireless terminal 420. Subsequently, the mobile wireless terminal 420 may reuse the SA with the first PDN GW to access the requested PDN.

In an alternative embodiment, various other IKEv2 fields may be used for exchanging the aforementioned information. For example, an identification payload may be used when EAP is used. When EAP is used, the second PDN GW 424-2 may provide an ID payload different from IDr (as in FIG. 10) that indicates that the first PDN GW 424-1 is to be used. Because the mobile wireless terminal 420 is already aware that the authentication is successful, the mobile wireless terminal 420 may interpret authentication as a signal that the request of service is accepted. The mobile wireless terminal 420 may also determine that the identity indicated in the ID payload corresponds to the PDN GW that is to be used, which is the first PDN GW 424-1 in this embodiment. Therefore, by including the address of the first PDN GW 424-1 in the ID payload, second PDN GW 424-2 may suggest the mobile wireless terminal 420 to connect via the first PDN GW 424-2.

In an alternative embodiment, an identification payload may be used when a protocol other than EAP is used. For example, the second PDN GW 424-2 may intentionally skip other payloads. Instead, the PDN GW 424-2 may only include an Identification payload (IDP_GW1) when responding to ID assertion and traffic selectors provided by the mobile wireless terminal 420. Since IDP_GW1 may be protected by keys generated from previously exchanged messages, the mobile wireless terminal 420 may verify the content of IDP_GW1 is correct. The mobile wireless terminal 420 may interpret the request as a signal that the request of service is accepted but it should be done with the identity indicated in the Identification payload IDP_GW1. The mobile wireless terminal 420 may base the interpretation on receiving IDP_GW1 rather than IDr. Therefore by including the address of the first PDN GW 424-1 in the Identification payload IDP_GW1, the second PDN GW 424-2 may provide an indication to the mobile wireless terminal 420 to connect via the first PDN GW 424-1.

Alternatively, the network control module 534 does not need to consider the identity of the mobile wireless terminal 420 and may select the PDN GW 424 to be used based on local information. For example, the local information may include the load of each PDN GW 424. In this embodiment, the mobile wireless terminal 420 may provide HDR, SAi1, KEi, Ni to the second PDN GW 424-2. The PDN GW 424-2 may respond with HDR, SAr1, KEr, Nr, IDP-GW1, [CERTREQ], which indicates the IP address of the first PDN GW 424-1. The mobile wireless terminal 420 and the first PDN GW 424-1 may then connect.

In this embodiment, the mobile wireless terminal 420 may discover and select the second PDN GW 424-2, and then send an IKEv2 message to the first PDN GW 424-1 to establish the SA. When the second PDN GW 424-2 receives this request message, the second PDN GW 424-2 selectively redirects the mobile wireless terminal 420 to another PDN GW, such as the first PDN GW 424-1. To do so, the second PDN GW 424-2, which may include the network control module 534, puts the IP address of the first PDN GW 424-1 into the ID payload and returns the IP address in the IKEv2 reply message. Various other payloads, such as the Notify (N) payload, may also be used to carry the IP address.

The mobile wireless terminal 420 may receive and analyze the reply message. During the analysis, the mobile wireless terminal 420 may determine that because the source IP address is different from that in the ID payload, the mobile wireless terminal 420 is therefore redirected to the first PDN GW 424-1. The mobile wireless terminal 420 may selectively determine the redirection based on the Notify message type if the Notify payload is used, as in FIG. 8. The mobile wireless terminal 420 may reuse an existing security association or establish a new security association with the first PDN GW 424-1 if needed. The mobile wireless terminal 420 and the first PDN GW 424-1 can authenticate each other when re-using an existing security association or establishing a new security association.

Although a particular number of each network device is shown, any number of each network device may be included. For example, in a home network and/or visited network, any number of PDN GWs, HSSs/AAA, etc. may be included. One or more PDN GWs may provide connectivity to one or more PDNs.

Figure 12:
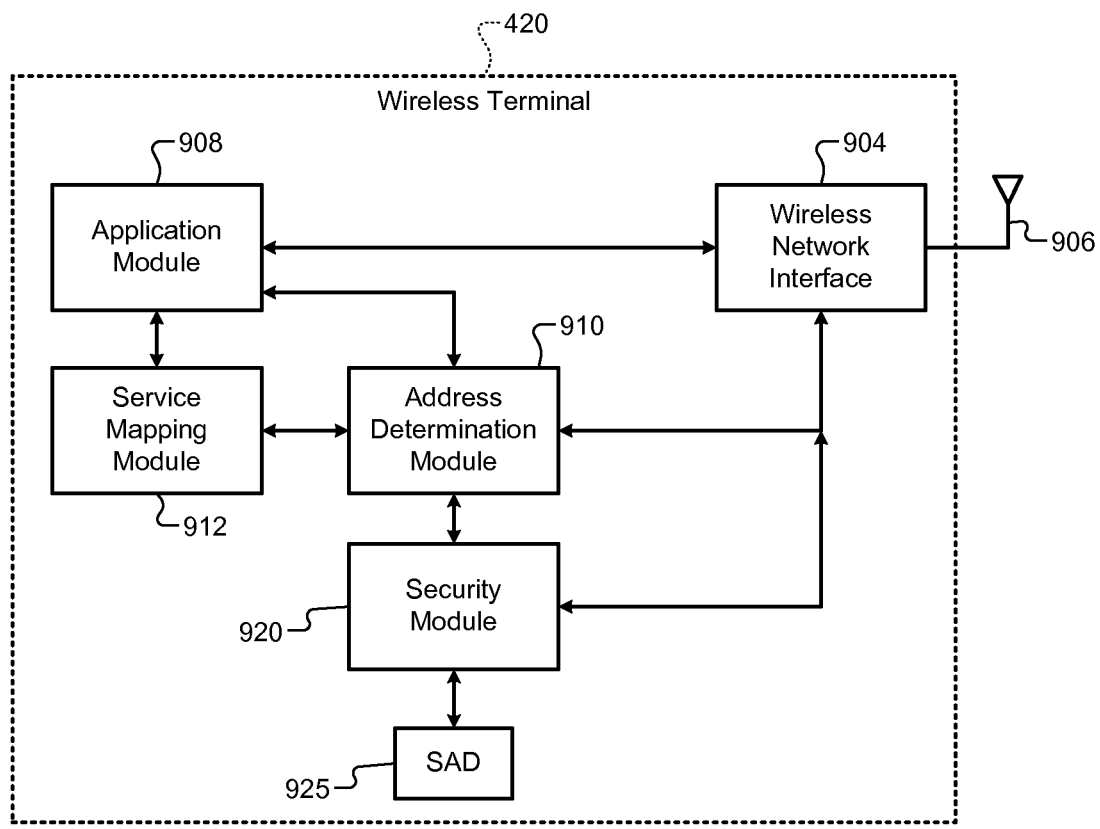
FIG. 12 is a functional block diagram of a mobile wireless terminal according to the present disclosure.

Referring now to FIG. 12, a functional block diagram of an exemplary mobile wireless terminal 420 is presented. The mobile wireless terminal 420 includes a wireless network interface 904 that transmits and receives wireless signals using an antenna 906. An application module 908 sends and receives data using the wireless network interface 904. The application module 908 may transmit and receive world-wide web data, voice-over IP (VoIP) data, text messaging data, push e-mail data, etc. The application module 908 may specify to the wireless network interface 904 which data corresponds to which service.

The wireless network interface 904 may maintain multiple IP addresses, one IP address for each PDN 422 with which the mobile wireless terminal 420 is in communication. Each PDN 422 may provide one or more of the services used by the application module 908. An address determination module 910 configures an address for each PDN 422 with which the wireless network interface 904 communicates. The PDN with which the wireless network interface 904 communicates may be determined based upon the desired services for the application module 908.

The application module 408 may consult a service mapping module 912 to determine which PDNs are necessary for the desired services. The service mapping module 912 may include service identifiers for each service that the application module 908 may request. The service identifiers correspond to a PDN identified by a correponding access point name. In various implementations, a single PDN may provide more than one service. As an example, if the application module 408 desires to perform web browsing, the application module 908 may determine from the service mapping module 912 that connectivity to one of the access point names should be requested. The application module 908 and/or the service mapping module 912 may signal to the address determination module 910 that one of the access point names is desired.

The address determination module 910 establishes connectivity with APNs. In various implementations, the address determination module 910 may establish connectivity with a set of default access point names. The address determination module 910 may instruct the wireless network interface 904 to transmit router solicitation messages and/or DHCP requests including access point name information in order to discover PDN GWs 424. When router advertisements and/or DHCP replies are received, the address determination module 910 parses these messages to extract IP address information. The address determination module 910 may form full IP addresses based on prefixes. The address determination module 910 may then indicate to the application module 908 which IP address corresponds to which access point name. The application module 908 can then use the IP address corresponding to a certain access point name for data related to the service provided by that access point name. The address determination module 904 may receive commands from the network control module 534 that indicate which PDN GW is to be used to access the first PDN 422-1 in response to attempts to connect to one of the PDN GWs 424.

The mobile wireless terminal 420 may also include a security module 920 that acquires and implements the SA with the first PDN GW 424-1 for access to the first PDN. The security module 920 may reuse the security association for communications with the first PDN GW 424-1 for communications with the second PDN 422-2. The security module 920 may use a security protocol, such as IKEv2 to set up the security association. The mobile wireless terminal 420 may also include a security database, such as a SAD 925 that stores information relating to previously acquired security associations. The security module 920 may receive and analyze IKE exchanges in order to determine whether a security association may be reused and how to implement the reuse.

Figure 13:
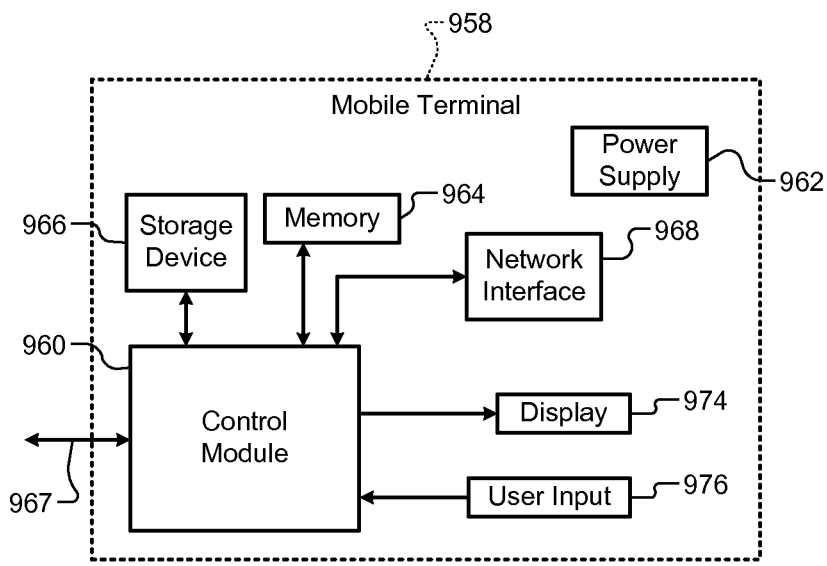
FIG. 13 is a functional block diagram of a mobile phone according to the present disclosure.

Referring now to FIG. 13, the teachings of the disclosure can be implemented in a control module of a mobile phone 958. The mobile phone 958 includes the phone control module 960, a power supply 962, memory 964, a storage device 966, and a wireless network interface 967. The mobile phone 958 may include a network interface 968, a display 974, and a user input device 976 such as a keypad and/or pointing device. If the network interface 968 includes a wireless local area network interface, an antenna (not shown) may be included.

The phone control module 960 may receive input signals from the wireless network interface 967, the network interface 968 and/or the user input device 976. The phone control module 960 may process signals, including encoding, decoding, filtering, and/or formatting, and generate output signals. The output signals may be communicated to one or more of memory 964, the storage device 966, the wireless network interface 967 and the network interface 968.

Memory 964 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 966 may include an optical storage drive, such as a DVD drive, and/or a hard disk drive (HDD). The power supply 962 provides power to the components of the mobile phone 958.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A system comprising:
    a first gateway configured to provide access to (i) a first network, and (ii) a second network;
    a second gateway configured to provide access to the second network; and
    a network device configured to
        determine whether a wireless terminal is (i) communicating with the first network via the first gateway, and (ii) attempting to communicate with the second network via the second gateway,
        determine whether the first gateway permits the wireless terminal to communicate with the second network, and
        in response to determining (i) that the wireless terminal is communicating with the first network via the first gateway and is attempting to communicate with the second network via the second gateway, and (ii) that the first gateway permits the wireless terminal to communicate with the second network, permit the wireless terminal to access the second network via the first gateway (i) prior to the wireless terminal establishing a connection with the second gateway, and (ii) based on information about the first gateway received by the wireless terminal from the network device during an Internet key exchange between the wireless terminal and the second gateway.

2. The system of claim 1, wherein the network device includes one or more of (i) a home subscriber server and (ii) an authentication, authorization, and accounting server.

3. The system of claim 1, further comprising:
    the wireless terminal,
    wherein the wireless terminal is configured to
        discover the second gateway in response to the wireless terminal attempting to access the second network.

4. The system of claim 1, wherein:
    the first gateway is configured to communicate with a home network; and
    the second gateway is configured to communicate with a visited network in which the wireless terminal is roaming.

5. The system of claim 1, further comprising:
    the wireless terminal,
    wherein the wireless terminal is configured to connect to (i) the first network,
    and (ii) the second network using a host-based mobility protocol.

6. The system of claim 5, wherein the wireless terminal is configured to connect to the second gateway by exchanging (i) a binding update message, and (ii) a binding acknowledgement message.

7. The system of claim 1, further comprising the wireless terminal, wherein the wireless terminal is configured to establish a security association with the first gateway to access the first network, and use the security association to access the second network via the first gateway.

8. The system of claim 7, wherein:
    the network device is configured to provide an indication to the wireless terminal; and
    the indication indicates to the wireless terminal that, to access the second network, the wireless terminal is to use (i) the first gateway, and (ii) the security association established by the wireless terminal with the first gateway to access the first network.

9. The system of claim 8, wherein the network device is configured to provide the indication during an Internet key exchange between (i) the wireless terminal, and (ii) the second gateway.

10. The system of claim 9, wherein the network device is configured to:
    define an attribute indicating that the first gateway communicates with the second network, and generate a payload including the attribute during the Internet key exchange, wherein the wireless terminal is configured to access the second network via the first gateway based on the payload.

11. The system of claim 10, wherein the payload includes:
information for a plurality of gateways permitting access to the second network,
and priority data indicating an order in which the wireless terminal is to communicate with the plurality of gateways.

12. A method comprising:
determining, at a network device,
whether a wireless terminal is (i) communicating with a first network via a first gateway and (ii) attempting to communicate with a second network via a second gateway, and
whether the first gateway permits the wireless terminal to communicate with the second network; and
in response to determining (i) that the wireless terminal is communicating with the first network via the first gateway and is attempting to communicate with the second network via the second gateway, and (ii) that the first gateway permits the wireless terminal to communicate with the second network, permitting the wireless terminal to access the second network via the first gateway (i) prior to the wireless terminal establishing a connection with the second gateway, and (ii) based on information about the first gateway received by the wireless terminal from the network device during an Internet key exchange between the wireless terminal and the second gateway.

13. The method of claim 12, wherein the network device includes one or more of (i) a home subscriber server and (ii) an authentication, authorization, and accounting server.

14. The method of claim 12, further comprising:
discovering the second gateway in response to the wireless terminal attempting to access the second network.

15. The method of claim 12, further comprising:
communicating with a home network via the first gateway; and
communicating with a visited network via the second gateway,
wherein the wireless terminal is roaming in the visited network.

16. The method of claim 12, further comprising connecting the wireless terminal to (i) the first network, and (ii) the second network using a host-based mobility protocol.

17. The method of claim 16, further comprising connecting the wireless terminal to the second gateway by exchanging (i) a binding update message, and (ii) a binding acknowledgement message.

18. The method of claim 12, further comprising:
establishing a security association between (i) the wireless terminal and (ii) the first gateway to permit the wireless terminal to access the first network; and
accessing the second network from the wireless terminal via the first gateway using the security association.

19. The method of claim 18, further comprising:
providing an indication from the network device to the wireless terminal,
wherein the indication indicates to the wireless terminal that, to access the second network, the wireless terminal is to use (i) the first gateway, and (ii) the security association established by the wireless terminal with the first gateway to access the first network.

20. The method of claim 19, further comprising providing the indication during an Internet key exchange between (i) the wireless terminal, and (ii) the second gateway.

21. The method of claim 20, further comprising:
defining, at the network device, an attribute indicating that the first gateway communicates with the second network;
generating, at the network device, a payload including the attribute during the Internet key exchange; and accessing the second network from the wireless terminal via the first gateway based on the payload.

22. The method of claim 21, wherein the payload includes:
information for a plurality of gateways permitting access to the second network,
and priority data indicating an order in which the wireless terminal is to communicate with the plurality of gateways.

* * * * *